United States Patent

[11] 3,540,732

[72] Inventor Henry Allen Wilson
 4630 Leona St., Tampa, Florida 33609
[21] Appl. No. 701,705
[22] Filed Jan. 30, 1968
[45] Patented Nov. 17, 1970

[54] JIGSAW PUZZLE WITH SIMILARLY SHAPED AND SIMILARLY CODED SUBASSEMBLIES
 9 Claims, 7 Drawing Figs.
[52] U.S. Cl. .................................................. 273/157
[51] Int. Cl. .................................................. A63f 9/10
[50] Field of Search ...................................... 273/156, 157

[56] References Cited
UNITED STATES PATENTS

| 1,276,344 | 8/1918 | Gilman | 273/157UX |
| 1,345,490 | 7/1920 | Hoy | 273/157 |
| 1,948,962 | 2/1934 | Decker | 273/157 |
| 3,010,723 | 11/1961 | Moss | 273/157 |
| 3,403,460 | 10/1968 | Barrows | 273/157X |

FOREIGN PATENTS

| 110,992 | 11/1917 | Great Britain | 273/157 |

Primary Examiner—Anton O. Oechsle
Attorney—Everett G. Clements

ABSTRACT: A jigsaw puzzle comprising a scene printed on one face and a code on the opposite face. The code is arranged to indicate the zones or subassemblies of the puzzle in which the separate pieces are fitted. The zones can be indicated by different colors or by different indicia. Complicated puzzles can be solved by dividing the pieces into groups containing the common zone characteristic to provide a plurality of simple puzzles capable of simple solution. Such a puzzle is thereby made useful to treat the mentally deficient.

Patented Nov. 17, 1970 3,540,732
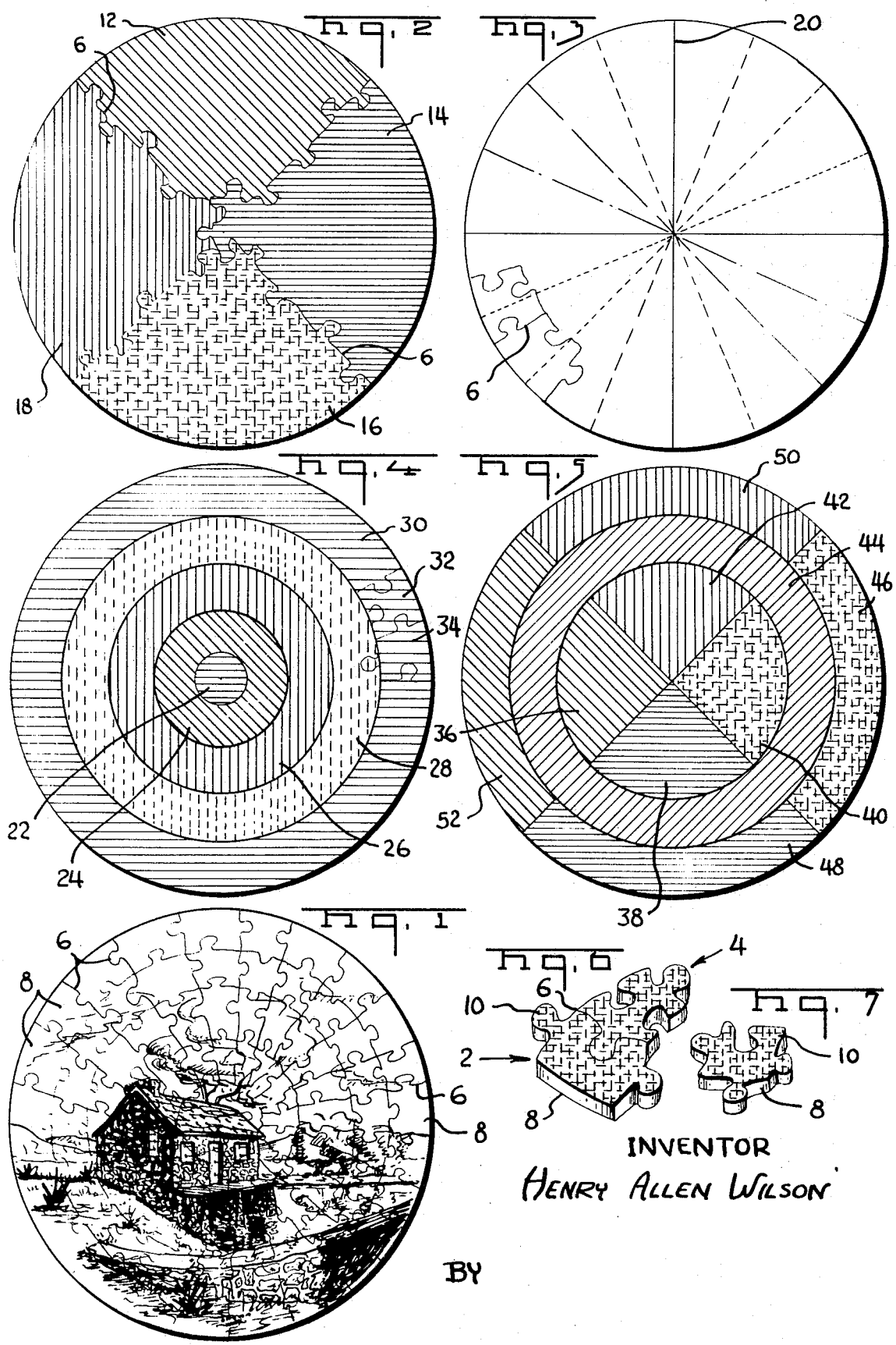
INVENTOR
HENRY ALLEN WILSON
BY

JIGSAW PUZZLE WITH SIMILARLY SHAPED AND SIMILARLY CODED SUBASSEMBLIES

THE INVENTION

This invention relates to a jigsaw puzzle and particularly to a puzzle which is to be used for mental therapeutic purposes.

There are some people who find it difficult to perform anything but simple tasks. If the task appears to be lengthy or have some degree of difficulty there is immediate resignation from any attempt to embark on the performance of the task. It is an object of this invention to provide a complicated task that can be broken down into a number of simple tasks to prevent any resignation and to entice continuous activity.

It is a further object of the invention to provide a complicated puzzle for use by the young or mentally troubled or retarded to induce them to enter upon tasks that they would normally shirk.

In accordance with the invention a complicated jigsaw puzzle is reduced into a number of simple puzzles, each of which will entice a patient to embark on an attempt to complete the task of assembly.

A complete understanding of the invention will be manifest upon reading the accompanying description in conjunction with the drawing wherein:

FIG. 1 discloses the scene illustrated by the complete puzzle with only some of the division lines indicating the interlocking segment of the unit puzzle being shown;

FIG. 2 discloses the back face of the puzzle unit showing one mode of coding the interlocking segments;

FIG. 3 is similar to FIG. 2 illustrating a modified form of coding;

FIG. 4 is similar to FIG. 2 illustrating another form of coding;

FIG. 5 is similar to FIG. 2 illustrating a fourth form of coding;

FIG. 6 illustrates a pair of assembled interlocking segments; and

FIG. 7 illustrates the coding on a single segment.

FIG. 1 is illustrative of a complete scene which can be assembled from the individual interlocking pieces of the puzzle of the instant invention. As is usual, the scene is composed of a plurality of individual pieces 2, 4 which are interfitted as shown in FIG. 6, however, the outlines 6 indicating the shape of the individual pieces have been largely omitted for the sake of clarity. Each piece however is provided on one face 8 thereof with a portion of the scene and is also provided on its opposite face 10 with a code to indicate a zone of the scene in which the piece is fitted. Both scene and code can be printed.

In FIG. 2 the coded portion of the puzzle is shown and comprises four zones or subassemblies 12, 14, 16, 18 arranged as annularly disposed segments. Each segment is printed with a different color as indicated by the various hatching designs, or the segments can be printed with the same color but with the design of each segment being as disclosed by the hatching. Each zone is shown, of course, as separated by outlines 6 which indicate the lines of demarcation, however, between the pieces have been largely omitted for the sake of clarity.

In FIG. 3 is illustrated another form of coding. In this form a plurality of radially disposed lines 20 of different configurations and/or colors are supplied. The lines 6 of demarcation between the pieces have again been largely omitted.

In FIG. 4 the form of coding comprises a plurality of concentric rings 22, 24, 26, 28 and 30 each ring being of different color and/or design as indicated with respect to FIG. 2. The lines of demarcation between the pieces have been largely omitted from the FIG. as the rings may be circles as illustrated, which cut across the lines of demarcation 6, as illustrated, by the pair of pieces 32, 34 or may be formed along the bordering lines 6, as in FIG. 2.

In FIG. 5 the coding comprises four zones 36, 38, 40 and 42, a completed ring 44 and an outer ring of segments 46, 48, 50 and 52. The lines of demarcation of the pieces of the puzzle have not been illustrated but the separation between the coding zones can either follow the lines of demarcation between the pieces in adjacent zones or can be made to cross the demarcation lines to provide curves of uniform radius and segments having straight radial lines. In this form of the invention as in the other forms heretofore described the zones can be printed with different colors or/and printed with different designs and the same color as indicated by the the design of the hatching as shown.

The difficulty of solution of the puzzles can be varied by changing the number, shape, color, and/or design of the coding zones.

In use, the pieces of the puzzle are intermixed and placed face down on a supporting surface. The pieces are then arranged in groups or piles having the same code and assembled. By noticing the arrangement of the pieces they can be reassembled face up to produce the scene. Complex puzzles can be thus assembled by reducing the puzzle to a plurality of simple puzzles.

While the illustrated puzzles are shown circular it is obvious that any desired shape could be used, i.e. rectangular, octagonal etc.

I claim:

1. A jigsaw puzzle comprising a plurality of releasably interlocked segments depicting a scene on one face and a coding means comprising similarly shaped subassemblies of segments defining zones on the opposite face for indicating the portion of the scene to which each segment appertains, and indicia means on each segment of each said subassembly, the indicia means of the segments of the same zone being the same with the indicia means of the different zones being different.

2. A puzzle as defined in claim 1 wherein the coding means comprises a plurality of zones of different colors.

3. A puzzle as defined in claim 2 wherein the zones are arranged in a plurality of concentric rings.

4. A puzzle as defined in claim 2 wherein the zones are arranged in a plurality of annularly disposed segments.

5. A puzzle as defined in claim 2 wherein the coding means comprises a plurality of radially arranged lines each having an individual characteristic.

6. A puzzle as defined in claim 2 wherein the zones are arranged with a center area of annularly disposed segments and concentric rings surrounding the center area.

7. A puzzle as defined in claim 2 wherein the coding means comprises a center area of annularly disposed segments, a ring surrounding said segments, and a segmental ring surrounding said first ring.

8. A puzzle as defined in claim 1 wherein the coding means comprises a plurality of zones each distinguished by a different design.

9. A puzzle as defined in claim 8 wherein selected ones of the designs are of the same color.